United States Patent [19]
Martyashin et al.

[11] 3,843,925
[45] Oct. 22, 1974

[54] METHOD FOR MEASURING PARAMETERS OF COMPLEX ELECTRIC CIRCUIT COMPONENTS AND DEVICE FOR EFFECTING SAME

[76] Inventors: Alexandr Ivanovich Martyashin, ulitsa Kirova, 69, kv. 59; Andrei Elizarovich Morozov, ulitsa Uritskogo, 44/10, kv.62; Eduard Konstantinovich Shakhov, ulitsa Gladkova, 13, kv.5; Viktor Mikhailovich Shlyandin, ulitsa Lermontova, 12, kv.17, all of Penza, U.S.S.R.

[22] Filed: June 11, 1973

[21] Appl. No.: 368,684

[52] U.S. Cl. .............................................. 324/57 R
[51] Int. Cl. .......................................... G01r 27/00
[58] Field of Search ................................... 324/57 R

[56] References Cited
UNITED STATES PATENTS

| | | | |
|---|---|---|---|
| 2,577,592 | 12/1951 | Shiepe | 324/57 R |
| 2,604,511 | 7/1952 | Marzolf | 324/57 R |
| 2,626,981 | 1/1953 | Shiepe | 324/57 R |
| 3,017,571 | 1/1962 | Moricca et al. | 324/57 R X |
| 3,432,752 | 3/1969 | Frederickson et al. | 324/57 R |
| 3,480,857 | 11/1969 | Bialko et al. | 324/57 R |
| 3,624,494 | 11/1971 | Turan | 324/57 R |

*Primary Examiner*—Stanley T. Krawczewicz
*Attorney, Agent, or Firm*—Eric H. Waters

[57] ABSTRACT

A method, according to the invention, is effected by the application of a constant voltage directly across an input of a complex electric circuit, whose components are connected in parallel, and converting parameters of electric signals derived from an output of a measuring electric circuit, including the complex electric circuit, into time intervals. For this purpose, the current flowing through the components of a complex electric circuit is summed up with the linearly changing or constant reference current of the opposite direction, and a calibrated time interval is read off from the moment the total current or the integral of the total current attain a preset value. As the calibrated time interval elapses, the alteration of the linearly changing reference current is discontinued or the constant reference current is cut off. Then, as the total current or the integral of the current flowing through the components of the complex electric circuit attain a preset value, the constant voltage is cut off and the time interval is measured between the moment of reading off the calibrated time interval and that of cutting off constant voltage. Then the current obtained after the constant voltage is cut off is summed up with other linearly changing reference current or with other constant reference current and the time interval is measured between the moment the constant voltage is cut off and the moment the total current or the integral of the total current attain a preset value, the values of time intervals obtained being used for determining parameters of complex electric circuit components.

5 Claims, 3 Drawing Figures

METHOD FOR MEASURING PARAMETERS OF COMPLEX ELECTRIC CIRCUIT COMPONENTS AND DEVICE FOR EFFECTING SAME

The present invention relates to electrical measurement techniques, and in particular, to a method for measuring parameters of complex electric circuit components and a device for effecting same.

The claimed method for measuring parameters of a complex electric circuit components and the device for effecting same are chiefly used for measuring parameters of components of complex electric RC and RL circuits of diverse radioelectronic devices; they can also be used for measuring parameters of film RC components and signals emitted by RCL transducers and microtransducers.

Known in the art is a method for measuring parameters of complex electric circuit components, wherein to an electric measuring circuit including a complex electric circuit is supplied a constant voltage and the parameters of electric signals derived from the output of the electric measuring circuit are converted into time intervals whose values are used for determining parameters of the complex electric circuit components.

In the method for measuring parameters of complex electric circuit components hereinabove described, to an input of a measuring electric circuit, composed of a series-connected reference resistor and a parallel RC circuit is applied a constant voltage, while to a free lead of the parallel RC circuit is applied a zero potential. A transient process is then initiated in the measuring electric circuit, determining the alteration of voltage across its output, i.e. the lead of the parallel RC circuit connected to the reference resistor. As the transient process practically terminates, from the output of the measuring circuit in the steady-state duty is derived a constant voltage, which is stored and converted into a time interval which is measured afterwards. Then a zero potential voltage is applied to the input of the measuring electric circuit and the time interval is measured between the moment the voltage is applied and the moment the voltage of a repeatedly initiated transient process, derived from the output of the measuring electric circuit, equals a definite portion of constant voltage stored before.

The method for measuring parameters of complex electric circuit components described above fails to provide for the measurement of parameters of components of a parallel RL network, since in this case the measuring electric circuit should be composed of a series-connected reference inductance coil and a parallel RL network, and in the steady-state duty a voltage derived from the output of the measuring electric circuit will be defined not by the value of inductance L of the inductance coil of the parallel RL network, but by the resistance value of the inductance coil losses of the parallel RL network.

Thereoretically, with both the reference inductance coil and the inductance coil L featuring no losses, a source of constant voltage of infinite power should be provided for effecting said method for measuring parameters of complex electric circuit components. Besides, the value of time intervals obtained does not feature linear dependences on the values of components of the parallel RC network, while in order to obtain separate information about the values of components of the parallel RC network, a mathematical processing of digital equivalents obtained in measuring said time intervals is required.

These disadvantages limit to a great extent the field of application of said method for measuring parameters of complex electric circuit components due to the fact that it is impossible to measure parameters of components of the parallel RL network and because of poor accuracy of measuring parameters of components of the parallel RC network (due to the non-linearity of the conversion function).

Known in the art is a device for measuring parameters of complex electric circuit components wherein a Commutator, whose first input is connected to the output of a source of constant voltage, while its second input is grounded, connects, on arrival of a signal sent by a control unit coinciding in time with an external signal, its first input to its output, the output of the commutator being connected via a reference element to a lead of the complex electric circuit which is also electrically coupled with the input of a comparison unit, the output thereof being connected to the input of the control unit, connected, in turn, to a time interval measuring unit, another lead of the complex electric circuit being connected directly to the commutator.

With an external signal obtained, the control unit sends a control signal to the commutator after which the latter connects the output of the source of constant voltage to the input of the measuring electric circuit, composed of a series-connected reference resistor and a parallel RC network, a free lead thereof being connected directly to the grounded input of the commutator. After a period required for the practical termination of the transient process in the measuring electric circuit, the control unit sends a signal to a voltage-to-time interval converter and to a storage, whose input is connected to the output of the measuring circuit which is also a lead of the reference resistor and one lead of the parallel RC circuit, while the output is connected, via a voltage divider with $e^{-1}$ division ratio to one input of the comparison unit. Upon said signal, the storage stores the output voltage of the measuring electric circuit, while the voltage-to-time interval converter, whose input is connected to the output of the measuring electric circuit and the output, to the input of the time interval measuring unit, converts the voltage into a proportional time interval, which is measured by the time interval measuring unit. Then the control unit sends a signal, upon which the commutator connects the input of the measuring electric circuit to its grounded input, while the time interval measuring unit starts measuring the next time interval, whose termination signal arrives at the time interval measuring unit from the comparison unit at the moment the voltage of a repeatedly initiated transient process derived from the output of the measuring electric circuit equals the voltage derived from the output of the voltage divider.

When measuring parameters of components of a parallel RC circuit with said device for measuring parameters of complex electric circuit components, high accuracy of measurements cannot be ensured, since digital equivalents of time intervals obtained during the measurements are not linearly dependent on parameters of components of the parallel RC circuit. Moreover, the digital equivalent of the time interval, whose termination is registered by the comparison unit, depends at the same time on a value of the capacitance C and on that of the resistance R of the parallel RC network. The accuracy is also reduced due to the shunting of the parallel RC network by an input resistance of the comparison unit. An essential disadvantage is also failure to measure parameters of components of the parallel RL network due to the fact that after the termination of the initially generated transient process, the current flowing through the measuring electric circuit (and, hence, the voltage across the output), composed in this particular case of a series-connected reference inductance coil and a parallel RL network, a free lead thereof being connected to the grounded input of the commutator, is determined not by a value of inductance L of the inductance coil of the parallel RL network, but by the ratio of values of resistances of losses of the reference inductance coil and the inductance coil of the parallel RL network.

It is an object of the present invention to provide a method for measuring parameters of complex electric circuit components and a device for effecting same allowing for a higher rate and accuracy of measurements.

This object is attained in a method for measuring parameters of complex electric circuit components, wherein to a measuring electric circuit, including a complex electric circuit, is applied a constant voltage and parameters of electric signals, derived from the output of the measuring electric circuit, are converted into time intervals, the values thereof being used for determining parameters of complex electric circuit components, according to the invention; the constant voltage is applied directly across the input of the complex electric circuit, with the components thereof being connected in parallel, and in order to convert electric signals derived from the output of the measuring electric circuit into time intervals, the current flowing through the components of the complex electric circuit is summed up with the linearly changing or constant reference current of opposite direction, whose alteration rate or magnitude is selected such as to ensure a coincidence of the alteration direction of the total current with the alteration direction or the direction of the reference current, and, beginning from the moment the total current of the integral of the total current attain a preset value, a calibrated time interval is read off, after whose termination the alteration of the linearly changing reference current is discontinued or the constant reference current is cut off; then, as the total current or the integral of the current flowing through the components of the complex electric circuit attain a preset value, the constant voltage is cut off and the time interval is measured between the moment of starting the reading off of the calibrated time interval and that of cutting off the constant voltage; then the current obtained after cutting off the constant voltage is summed up with other linearly changing reference current, whose alteration direction is opposite to that of said linearly changing reference current, or with other constant reference current, the direction thereof being opposite to that of said constant reference current, and the time interval is measured between the moment the constant voltage is cut off and the moment the total current or the integral of the total current attain a preset value.

It is advantageous to provide a device for effecting the method for measuring parameters of complex electric circuit components, wherein a commutator, whose first input is connected to an output of a constant voltage source, while its second input is grounded, connects, upon a signal sent by a control unit, coinciding in time with an external signal, its first input to its output, the output of the commutator being connected via a reference element to the output of the complex electric circuit, which is also electrically coupled with an input of a comparison unit whose output is connected to the input of the control unit, connected, in turn, to a time interval measuring unit; the other lead of the complex electric circuit is connected directly to the commutator, according to the invention; a d.c. amplifier features a parallel negative feedback, effecting electric coupling of the lead of the complex electric circuit with the comparison unit, which, at the moment an output voltage derived from the d.c. amplifier is equal to zero, sends a signal to the control unit, altering the state of the commutator, whereupon, following a calibrated time interval after the arrival of the first signal sent by the comparison unit, the output of the commutator is connected to its second input; at the moment of the arrival of the second signal from the comparison unit, the output of the commutator is connected to its third input connected to the output of the source of constant voltage of opposite polarity, while the other output of the commutator is connected to its second input; at the moment of the arrival of the third signal from the comparison unit, the output of the commutator is connected to its second input, while the direct connection of the commutator with the other lead of the complex electric circuit is effected by connecting said lead with the other lead of the commutator, which, following the arrival of the signal from the control unit coinciding in time with an external signal, is connected, via the commutator, to its third input.

In case the complex electric circuit is a parallel network of RL components, it is expedient to employ an inductance coil as a reference element, while the d.c. amplifier is coupled with a parallel resistive negative feedback.

In case the complex electric circuit is a parallel network of RC components, it is expedient to employ a resistor as a reference element, while the d.c. amplifier is coupled with a parallel capacitance negative feedback.

The claimed method for measuring parameters of complex electric circuit components and the device for effecting same increase the rate and accuracy of measurements and broaden the range of parameters to be measured.

Besides, the device is characterized by a simple design and small dimensions.

The nature of the invention will be clear from the following description of embodiments thereof taken in conjunction with the accompanying drawings, wherein.

Figure 1:
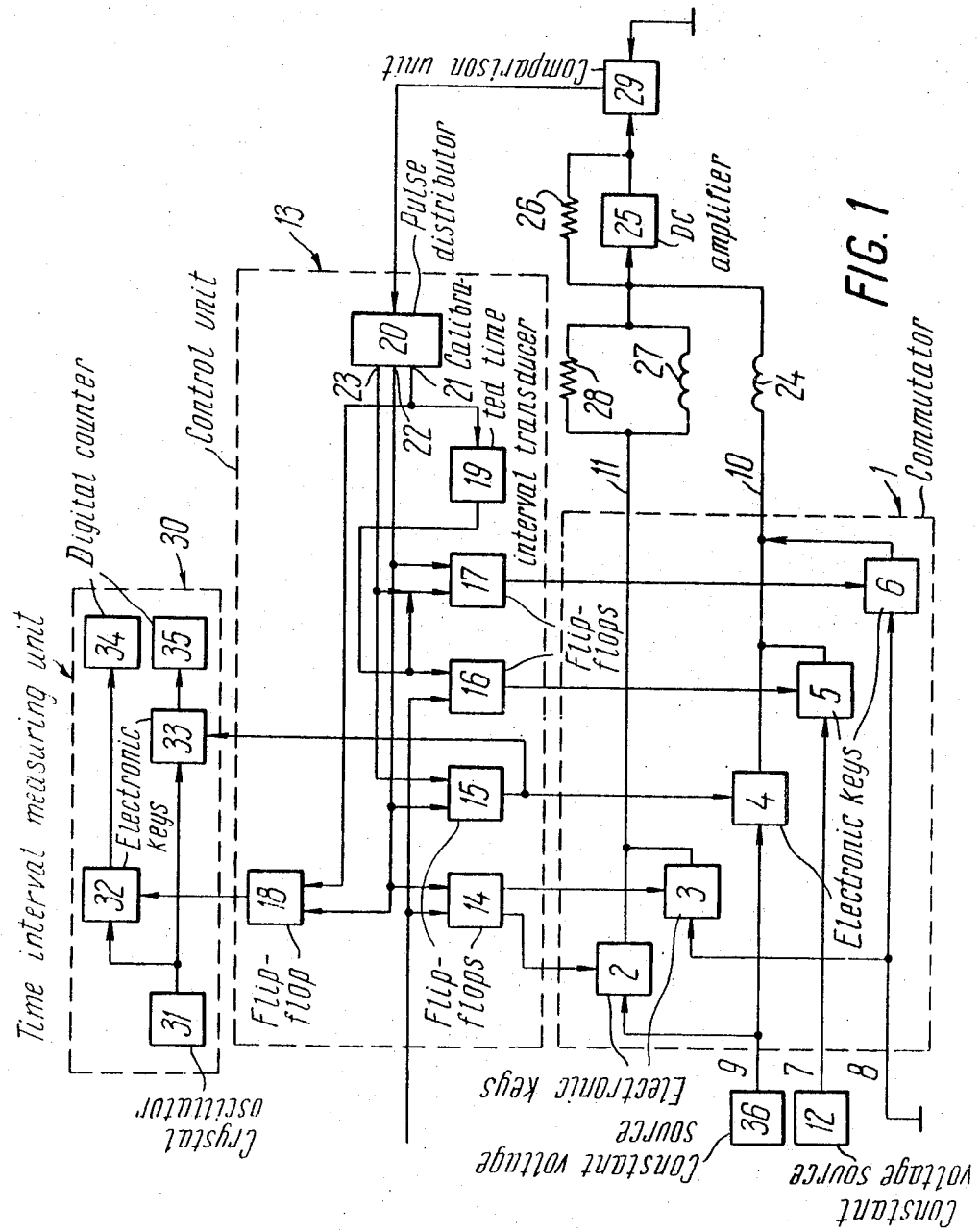
FIG. 1 is a functional diagram of the first embodiment of the claimed device for effecting the method for measuring parameters of complex electric circuit components.

The claimed device for effecting the method for measuring parameters of complex electric circuit components comprises a commutator 1 (FIG. 1) consisting of electronic keys 2,3,4,5 and 6, each utilizing one transistor. The first input 7 of the commutator 1 is the input of the key 5, the second input 8 of the commutator 1 is interconnected inputs of the keys 3 and 6, and the third input is interconnected inputs of the keys 2 and 4. A first output 10 of the commutator 1 is interconnected outputs of the keys 4,5 and 6, while a second output 11 of the commutator 1 is interconnected outputs of the keys 2 and 3. The second input 8 of the commutator 1 is grounded, while the first input 7 is connected to the output of a constant voltage source 12, utilizing semiconductor components wired according to a known diagram.

The device is also provided with a control unit 13, consisting of flip-flops 14, 15, 16, 17 and 18, a calibrated time interval transducer 19 featuring in the present embodiment a single-shot multivibrator wired according to a known diagram, also, a pulse distributor 20 utilizing two flip-flops wires according to a known diagram and having digital inputs, an output thereof being connected to a diode matrix, which ensures the decoding of the state of said flip-flops.

A first output 21 of the pulse distributor 20 is connected to an input "1" of the flip-flop 18 and to an input of the calibrated time interval transducer 19, an output thereof being connected to an input "0" of the flip-flop 16 and to an input 1 of the flip-flop 17. A second output 22 of the pulse distributor 20 is connected to inputs 0 of the flip-flops 17, 14, and 18 and to an input 1 of the flip-flop 15. A third output 23 of the pulse distributor 20 is connected to an input 0 of the flip-flop 15 and to the input 1 of the flip-flop 17. To the inputs 1 of the flip-flops 14 and 16 is applied an external signal produced by a source (not shown in the Figure). The outputs 1 and 0 of the flip-flop 14 are connected to control inputs of the keys 2 and 3, respectively, while the outputs of the flip-flops 15, 16 and 17 are connected to control inputs of the keys 4, 5 and 6, respectively.

The first input 10 of the commutator 1 is connected, by means of a reference component featuring in the present embodiment of the device a reference inductance coil 24, to an input of a d.c. amplifier 25 with a parallel resistive negative feedback (ensured by the introduction of a resistor 26 into the negative feedback circuit). The second output 11 of the commutator 1 is also coupled, by means of a complex electric circuit featuring an inductance coil 27 and a resistor 28 connected in parallel in the present embodiment of the device, to an input of the amplifier 25, whose output is connected to an input of a comparison unit 29. A second input of the comparison unit 29 is grounded, whilst the output is connected to the input of the pulse distributor 20. The d.c. amplifier 25 and the comparison unit 29 employ one integrated microcircuit.

The device is also provided with a time interval measuring unit 30 comprising a crystal oscillator 31 utilizing semiconductor elements wired according to a known diagram, and electronic keys 32 and 33 similar to the keys 2,3,4,5 and 6. The unit 30 also comprises digital counters 34 and 35, featuring high-frequency decimal pulse counters assembled according to a known diagram. An output of the pulse oscillator 31 is connected to inputs of the keys 32 and 33, whose outputs are connected to inputs of the digital counters 34 and 35, respectively. A control input of the key 32 is connected to the output of the flip-flop 18, whilst that of the key 33 is connected to the output of the flip-flop 15.

The third output 9 of the commutator 1 is connected to an output of a constant voltage source 36, similar to the source 12, but of the opposite polarity.

Figure 2:
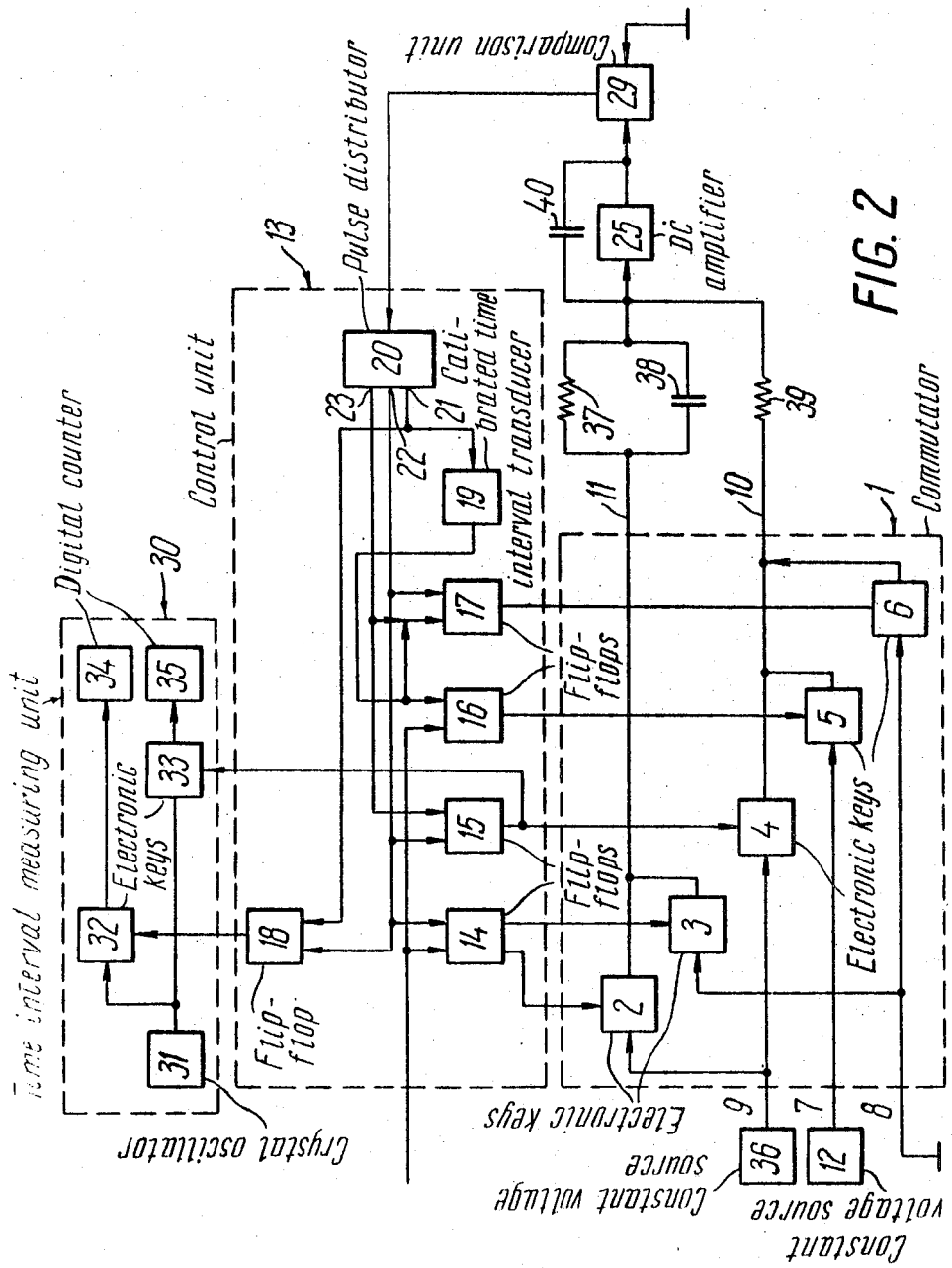
FIG. 2 is a functional diagram of the second embodiment of the claimed device.

Another embodiment of the device for effecting the method for measuring parameters of complex electric circuit components is possible, which is similar to the device hereinabove described, the difference being that a resistor 37 (FIG. 2) and a capacitor 38 connected in parallel are used as a complex electric circuit, the reference element featuring a reference resistor 39 connected in a manner similar to the reference inductance coil 24 (FIG. 1), the amplifier 25 (FIG. 2) being coupled with a parallel capacitive negative feedback. Such a coupling is ensured by the introduction of a capacitor 40 into the negative feedback circuit of the amplifier 25.

Various of the components utilized in carrying out the inventive measuring method and forming part of the device are well known in the art, as follows 1. Electronic keys 2, 3, 4, 5, 6, 32 and 33. G. Corn and T. Corn, "Electronic Analog and Analog-to-Digital Computers", Part I, Theory and Principal Functional Units, translated from English, Mir Publishers, Moscow, 1967, p.302, FIG. 6.20d.

2. Calibrated time interval transducer 19. L.M. Goldenberg, "Theory and Calculation of Pulse Apparatus Based on Semiconductor Devices," Sviaz Publishers, Moscow, 1969, p.308, FIG. 5.17d.

3. Pulse distributor 20. Handbook of Radioelectronics, Vol. 1, Ed. by A.A. Kulikovsky, Energia Publishers, Moscow, 1967, p. 613, FIG. 11-114.

4. Comparison unit 29. V.M. Shliandin, "Digital Measuring Converters and Devices", Visshaia Shkola Publishers, Moscow, 1973, (in production from Oct. 24, 1972) pp. 105-06, FIGS. 2,34 and 2.35.

5. Crystal oscillator 31. V.N. Yakovlev, "Transistorized Pulse Oscillators", 2nd ed., Tekhnika Publishers, Kiev, 1968, p.286, FIG. 151a.

6. Digital counters 34 and 35. M.I. Lerner, A.G. Rizhevsky, and V.M. Shliandin, "Digital Display", Energia Publishers, Moscow, 1970, p.30, FIG. 2-19.

7. Constant voltage sources 12 and 36. V.I. Karpov, "Semiconductor Compensating Voltage and Current Stabilizers", 2nd ed., Energia Publishers, Moscow, 1967, p.99, FIG. 59.

These terms may also be readily found in "The Encyclopedia of Electronics", Charles Susskind, 1962, Reinhold Publishing Corporation, New York.

The device for effecting the method for measuring parameters of complex electric circuit components hereinabove described operates as follows.

An external signal produced by the source is applied to the inputs 1 of the flip-flops 14 (FIG. 1) and 16 of the control unit 13 and shift them to position 1, the potential derived from the output 1 of the flip-flop 14 making the key 2 of the commutator 1 conducting, while the potential derived from its zero output making the key 3 non-conducting, and the potential derived from the output of the flip-flop 16 making the key 5 conducting. As a result, a negative constant voltage $-E_o$ is supplied from the constant voltage source 36 via the conducting key 2 to the parallel inductance coil 27 and the resistor 28 of the complex electric circuit, while a positive constant voltage $+E_o$ is supplied from the output of the constant voltage source 12 to the reference inductance coil 24.

Figure 3:
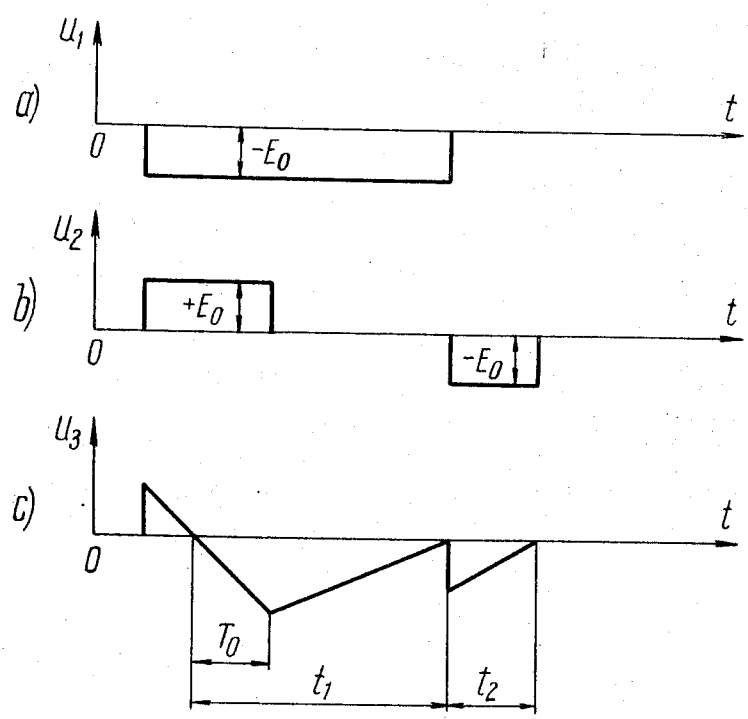
FIG. 3 represents Time Diagrams $a$, $b$ and $c$ of voltages $U_1$, $U_2$ and $U_3$ at the second output of the commutator, its first output and the output of the d.c. amplifier, respectively.

For a better understanding of the method for measuring parameters of complex electric circuit components, FIG. 3 shows Time Diagrams a, b and c of voltages $U_1$, $U_2$ and $U_3$ across the second output of the keying unit, its first output and the output of the d.c. amplifier, respectively. Voltages $-E_o$ and $+E_o$ are shown in diagrams a and b.

The current flowing through the reference inductance coil 24, being the reference current, starts rising according to the linearity law. The reference current is summed up with the current flowing through the components of the complex electric circuit across the input of the d.c. amplifier 25. The direction of alteration of the total current will coincide with that of the current flowing through the reference inductance coil 24, provided the value of inductance $L_o$ of the reference inductance coil 24 is less than the value of inductance L of the inductance coil 27 of the complex electric circuit. The comparison unit 29 determines the moment the total current attains a preset value by comparing the voltage across the output of the d.c. amplifier 25, which is proportional to the value of the total current and to the value of resistance $R_o$ of the resistor 26 included into the parallel negative feedback circuit of the amplifier 25, with the zero voltage. As the output voltage derived from the d.c. amplifier 25 attains a zero level, the comparison unit 29 sends a first signal to the pulse distributor 20, at whose first output 21 a pulse appears that actuates the calibrated time interval transducer 19 and shifts the flip-flop 18 to position 1. The transducer 19 starts counting the calibrated time interval $T_o$ (FIG. 3, diagram c), whilst the potential derived from the output of the flip-flop 18 makes conducting the key 32 of the time interval measuring unit 30. The pulses generated by the crystal oscillator 31 are sent to the input of the digital counter 34 via the conducting key 32, the counter starting the measurement of the first time interval $t_1$ (FIG. 3, Diagram c).

After the calibrated time interval $T_o$ elapses, a pulse derived from the output of the calibrated time interval transducer 19 resets the flip-flop 16 to zero. and shifts the flip-flop 17 to position 1. The key 5 becomes non-conducting, whilst the key 6, conducting, the reference inductance coil 24 being thus connected, via the conducting key 6, to the second grounded input 8 of the commutator 1. The current flowing through the reference inductance coil 24 becomes stable.

As the output voltage derived from the d.c. amplifier 25 attains the zero level for the second time, the second signal is derived from the output of the comparison unit 29. Across the second output 22 of the pulse distributor 20 is generated a pulse, which resets the flip-flops 14, 17 and 18 to zero and the flip-flop 15 to position 1. The keys 2, 6 and 32 become non-conducting, whilst the keys 3,4 and 33 become conducting. The digital counter 34 finishes the measuring of the time interval $t_1$, while the digital counter 35, across whose input pulses starts arriving from the crystal oscillator 31 via the conducting key 33, starts measuring the second time interval $t_2$ (FIG.3, Diagram c). The lead of the complex electric circuit is connected via the conducting key 3 to the second grounded input 8 of the commutator 1, while the constant negative voltage $-E_o$ supplied earlier to the complex electric circuit, is now being supplied from the output of the constant voltage source 36 to the reference inductance coil 24 via the conducting key 4. Across the coil 24 is generated a linearly changing current, being the other reference current, the direction of whose alteration is opposite to that of the current flowing through the reference inductance coil 24.

As the output voltage of the d.c. amplifier 24 attains the zero level again, from the output of the comparison unit 29 the third signal is passed, resulting in that across the third output 23 of the pulse distributor 20 a pulse is generated, resetting the flip-flops 17 and 15 to position 1. The keys 33 and 4 become non-conducting, whilst the key 6, conducting. The digital counter 35 finishes the measurement of the time interval $t_2$, and the reference inductance coil 24 becomes connected to the second grounded input 8 of the commutator 1 via the conducting key 6. The circuit hereby resumes its initial state.

The time intervals $t_1$ and $t_2$ thus obtained and measured inambiguously indicate the value of inductance L of the inductance coil 27 of the complex electric circuit, as well as the value of active conductance $G = 1/R$ of the resistor 28 of this circuit:

$$t_1 = (T_o/L_o) \cdot L,$$

$$t_2 = L_o \cdot (1/R).$$

The operation of another embodiment of a device for effecting the method for measuring parameters of complex electric circuit components is similar to that described above, the only difference being that due to the incorporation of a capacitor 40 into the parallel negative feedback circuit of the d.c. amplifier 25 (FIG.2), the latters output voltage is inversely proportional to the value of capacitance $C_o$ of the capacitor 40 and proportional to the integral of the total current. Owing to the use of the reference resistor 39 as a reference element, the current flowing through the latter is stable.

The time intervals $t_1$ and $t_2$ obtained and measured inamhiguosly indicate the value of active resistance R of the resistor 37, as well as the value of capacitance C of the capacitor 38 of the complex electric circuit:

$$t_1 = (T_o/R_o) \cdot R,, (10)^2 t_2 = R_o \cdot C_o$$

The claimed method for measuring parameters of complex electric circuit components and device for effecting same are marked by a fast response, a wide range of application and high accuracy.

In measuring parameters of individual RCL components and those of complex electric circuit components the claimed method and device allow for a substantial increase in the accuracy of measurements owing to the elimination of conversion errors due to losses through capacitors and inductance coils, unstable operating thresholds and voltage sources.

The method and device make it possible to reduce the capacity dissipated in the measuring electric circuit, thus allowing for measuring parameters of film RC components and for converting signals derived from RCL microtransducers into time intervals.

The device effecting the method for measuring parameters of complex electric circuit components is marked by a simple design and small dimensions.

What is claimed is:

1. A method for measuring parameters of complex electric circuit components consisting in the application of a constant voltage directly across the input of a complex electric circuit whose components are connected in parallel; summing up of a current flowing through the components of said complex electric circuit with the linearly changing reference current of the opposite direction, whose alteration rate is selected such as to provide a coincidence of the direction of alteration of the total current with that of said reference current; reading off a calibrated time interval from the moment said total current attains a preset value, whereupon the alteration of said linearly changing reference current is discontinued; cutting off said constant voltage as the total current attains a preset value; measuring the time interval between the moment of starting the reading off of said calibrated time interval and that of cutting off said constant voltage; summing up of the current obtained after said constant voltage is cut off with other linearly changing reference current, the direction of whose alteration is opposite to that of said linearly changing reference current; measuring the time interval between the moment of cutting off said constant voltage and the moment the total current attains a preset value, the values of said time intervals being used for determining parameters of components of said complex electric circuit.

2. A method for measuring parameters of complex electric circuit components consisting in the application of a constant voltage directly across the input of a complex electric circuit whose components are connected in parallel; summing up a current flowing through the components of said complex electric circuit with a constant reference current of opposite direction, whose value is selected such as to provide a coincidence of the direction of the total current with that of said reference current; reading off a calibrated time interval from the moment the integral of said total current attains a preset value, whereupon said reference current is cut off; cutting off said constant voltage as the integral of the current flowing through the components of said complex electric circuit attains a preset value; measuring the time interval between the moment of starting the reading off of said calibrated time interval and the moment said constant voltage is cut off; summing up the current obtained after said constant voltage is cut off with other reference constant current, whose direction is opposite to that of said constant reference current; measuring the time interval between the moment said constant voltage is cut off and the moment the integral of total current attains a preset value, the values of said time intervals being used for determining parameters of components of said complex electric circuit.

3. A device for effecting the method for measuring parameters of complex electric circuit components comprising: a commutator; a constant voltage source connected to a first input of said keying unit; a second input thereof being grounded; a reference element connected to an output of said commutator and to a lead of a complex electric circuit, another lead thereof being connected to another output of said commutator; a comparison unit electrically coupled with said lead of the complex electric circuit; a d.c. amplifier with a parallel negative feedback ensuring the electrical coupling of said lead of the complex electric circuit with said comparison unit; a control unit, whose input is connected to an output of said comparison unit; said commutator connecting its first input to its output as a signal coinciding in time with an external signal is sent by said control unit; a time interval measuring unit connected to the output of said control unit; said comparison unit sending signals, whenever the output voltage derived from said d.c. amplifier is equal to zero, to said control unit, altering the state of said commutator; following a calibrated time interval after the arrival of the first signal sent by said comparison unit, the output of said commutator is connected to its second input, at the moment of the arrival of the second signal from said comparison unit, the output of said commutator is connected to its third input, whilst the other output of said commutator is connected to its second input; at the moment of the arrival of the third signal from said comparison unit, the output of said commutator is connected to its second input; said commutator connecting its other output to its third input after the arrival of a signal, coinciding in time with an external signal, from said control unit; a constant voltage source of a polarity opposite to the first constant voltage source connected to the third input of said commutator.

4. A device as claimed in claim 3 wherein, in case the complex electric circuit is a parallel connection of RL components, said reference element features an inductance coil, while a parallel negative feedback of said d.c. amplifier is resistive.

5. A device as claimed in claim 3 wherein, in case the complex electric circuit is a parallel connection of RC components, said reference element features a resistor, while a parallel negative feedback of said d.c. amplifier is capacitive.

* * * * *